United States Patent
Azar et al.

(10) Patent No.: US 11,004,586 B2
(45) Date of Patent: May 11, 2021

(54) PERMANENT MAGNET FOR A PERMANENT MAGNET MACHINE

(71) Applicant: SIEMENS GAMESA RENEWABLE ENERGY A/S, Brande (DK)

(72) Inventors: Ziad Azar, Sheffield (GB); Hans-Joergen Thougaard, Silkeborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 305 days.

(21) Appl. No.: 16/127,320

(22) Filed: Sep. 11, 2018

(65) Prior Publication Data

US 2019/0088392 A1   Mar. 21, 2019

(30) Foreign Application Priority Data

Sep. 15, 2017  (EP) ..................................... 17191422
Apr. 9, 2018   (EP) ..................................... 18166359

(51) Int. Cl.
*H01F 7/02*   (2006.01)
*H01F 41/02*  (2006.01)
(Continued)

(52) U.S. Cl.
CPC ........... *H01F 7/0221* (2013.01); *H01F 7/021* (2013.01); *H01F 7/0226* (2013.01);
(Continued)

(58) Field of Classification Search
CPC ...... H01F 7/0221; H01F 7/021; H01F 7/0226; H01F 7/0273; H01F 41/0253; H02K 1/27;
(Continued)

(56) References Cited

U.S. PATENT DOCUMENTS

| 6,606,019 B1 * | 8/2003 | Ohashi ................. H01F 1/0577 335/302 |
| 7,559,996 B2 * | 7/2009 | Miyata .................... B22F 3/24 148/302 |

(Continued)

FOREIGN PATENT DOCUMENTS

| CN | 202712987 U | 1/2013 |
| CN | 103999331 A | 8/2014 |

(Continued)

OTHER PUBLICATIONS

Communication pursuant to Article 94(3)EPC dated Feb. 17, 2020 for Application No. 17191422.9.

(Continued)

*Primary Examiner* — Mohamad A Musleh
(74) *Attorney, Agent, or Firm* — Schmeiser, Olsen & Watts LLP

(57) ABSTRACT

Provided is a permanent magnet for a permanent magnet machine, a permanent magnet machine, and a method of manufacturing a permanent magnet for a permanent magnet machine. The permanent magnet includes a base body having a first side and a second side which is an opposite side with respect to the first side, wherein at least one first slit is formed in the base body such that the at least one first slit extends from the first side in the direction of the second side.

14 Claims, 8 Drawing Sheets

(51) Int. Cl.
  *H02K 1/27* (2006.01)
  *H02K 1/17* (2006.01)
  *H02K 15/03* (2006.01)

(52) U.S. Cl.
  CPC ....... *H01F 7/0273* (2013.01); *H01F 41/0253* (2013.01); *H02K 1/27* (2013.01); *H02K 1/17* (2013.01); *H02K 15/03* (2013.01)

(58) Field of Classification Search
  CPC ........... H02K 1/17; H02K 15/03; H02K 1/06; H02K 2213/03
  See application file for complete search history.

(56) References Cited

U.S. PATENT DOCUMENTS

| | | | | |
|---|---|---|---|---|
| 8,692,639 | B2* | 4/2014 | Baarman | H01F 1/375 |
| | | | | 336/200 |
| 9,325,183 | B2* | 4/2016 | Backman | H02J 7/0042 |
| 9,691,533 | B2* | 6/2017 | Okada | H01F 7/021 |
| 2006/0186752 | A1 | 8/2006 | Matsumoto | |
| 2007/0017601 | A1* | 1/2007 | Miyata | H02K 1/278 |
| | | | | 148/105 |
| 2010/0244608 | A1 | 9/2010 | Kanada | |
| 2010/0320843 | A1 | 12/2010 | Kitamura et al. | |
| 2012/0104064 | A1* | 5/2012 | Nishikuma | B26F 3/002 |
| | | | | 225/1 |
| 2012/0125969 | A1* | 5/2012 | Nishikuma | H02K 15/03 |
| | | | | 225/93 |
| 2013/0057374 | A1 | 3/2013 | Adachi | |
| 2014/0245597 | A1 | 9/2014 | Doi et al. | |
| 2015/0003469 | A1 | 1/2015 | Gomez Martinez | |
| 2017/0054355 | A1* | 2/2017 | Aoyama | H02K 41/02 |

FOREIGN PATENT DOCUMENTS

| | | | |
|---|---|---|---|
| DE | 102013211858 A1 | 12/2014 | |
| EP | 1065777 A1 | 1/2001 | |
| EP | 2306623 A2 | 4/2011 | |
| EP | 2811628 B1 | 11/2015 | |
| JP | 2009033958 A | 2/2009 | |
| JP | 2013219911 A | 10/2013 | |
| TW | 200937466 A | 9/2009 | |
| WO | WO-2005019914 A1 * | 3/2005 | ............ G02F 1/093 |
| WO | 2014030547 A1 | 2/2014 | |
| WO | WO 2014030547 A1 | 2/2014 | |

OTHER PUBLICATIONS

Communication pursuant to Article 94(3)EPC dated Jan. 22, 2020 for Application No. 18184347.3.
Extended European Search Report dated Feb. 13, 2019 for Application No. 18194347.3.
European Search Reported dated Mar. 21, 2018 for Application No. 17191422.9.
European Communication pursuant to Article 94(3) EPC dated Sep. 10, 2020 for Application No. 17 191 422.9.
Non-English Chinese Office Action dated Nov. 5, 2020 for Application No. 2018110809203.

* cited by examiner

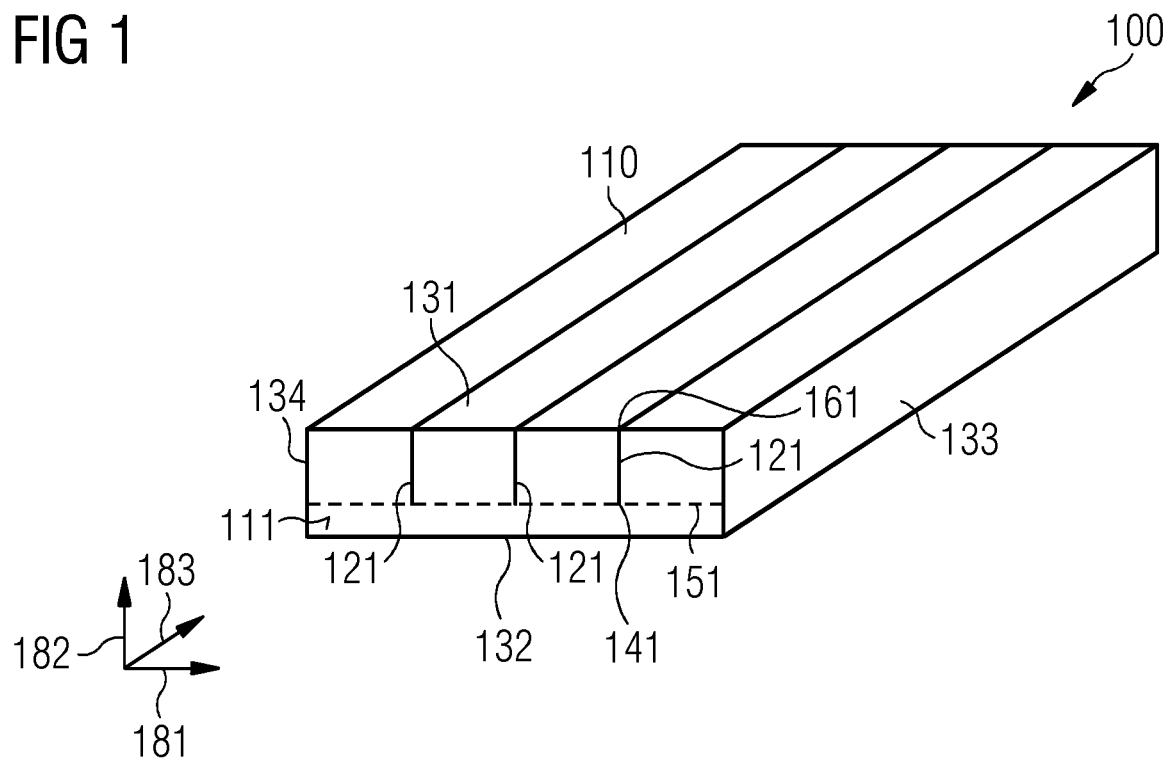
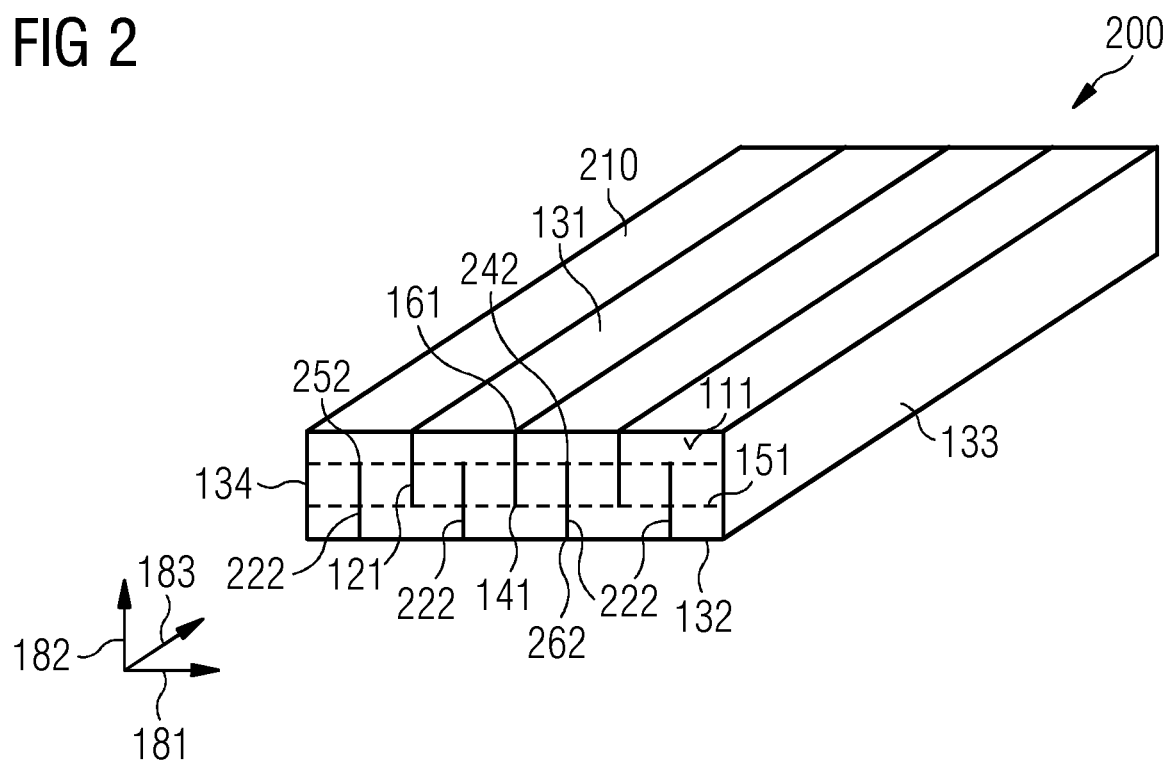

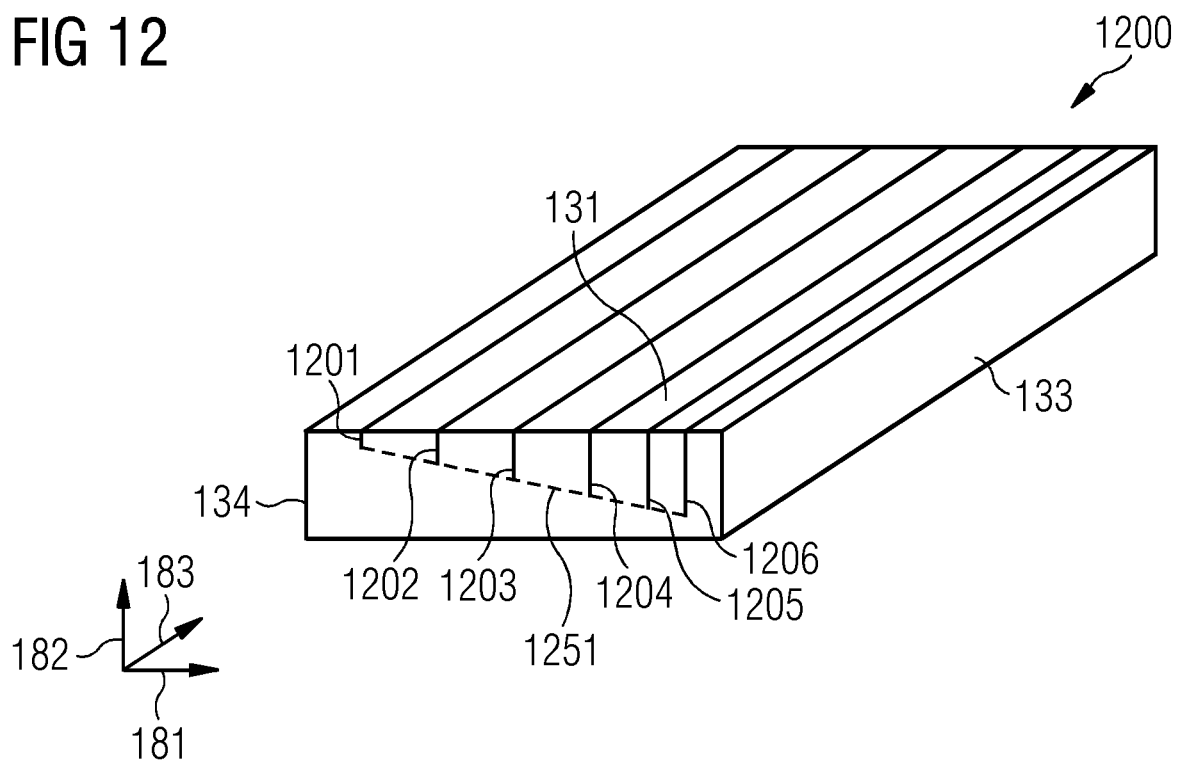
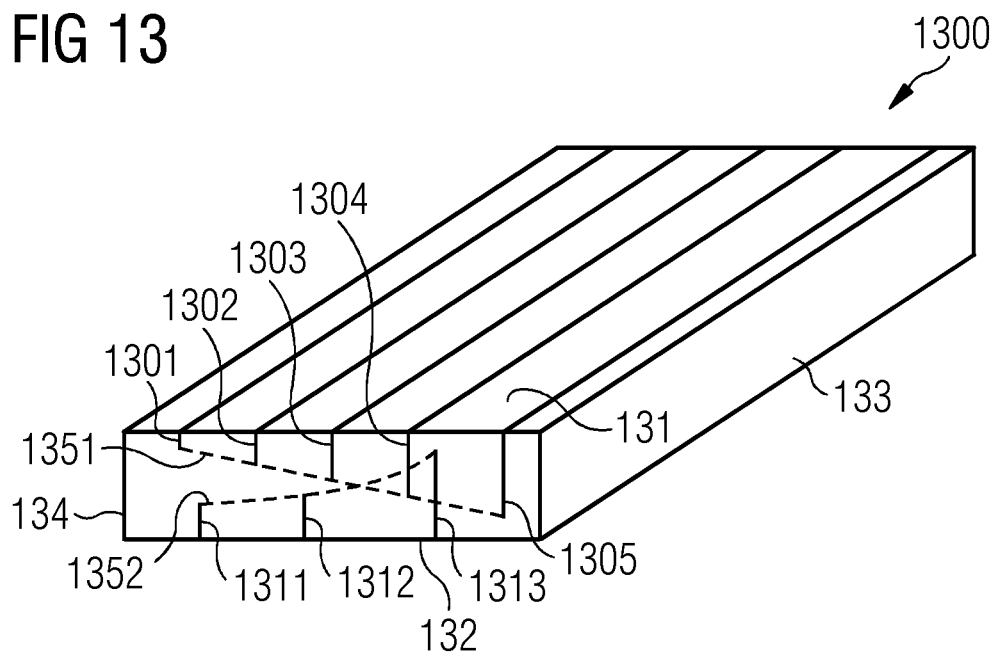

PERMANENT MAGNET FOR A PERMANENT MAGNET MACHINE

CROSS-REFERENCE TO RELATED APPLICATIONS

This application claims priority to European Application No. 18166359.2 having a filing date of Apr. 9, 2018 and European Application No. 17191422.9, having a filing date of Sep. 15, 2017, the entire contents both of which are hereby incorporated by reference.

FIELD OF TECHNOLOGY

The following relates to the field of reducing eddy current losses in permanent magnets in a permanent magnet machine. Particularly, embodiments of the present invention relate to a permanent magnet for a permanent magnet machine, it is also called a permanent magnet machine, and a method of manufacturing a permanent magnet for a permanent magnet machine.

BACKGROUND

In today's permanent magnet machines in order to reduce eddy current losses in permanent magnets of a permanent magnet machines, normally a magnet element is cut axially and circumferentially into small magnetic pieces which then are polished on all side surfaces. Afterwards, the small magnetic pieces are glued back together in one permanent magnet unit, this is normally called magnet segmentation.

A current full permanent magnet element 1401 according to the known art in a sectional view in the axial direction is shown in FIG. 14 together with a cover 1404, a baseplate 1403 and a glue layer 1402. The current full permanent magnet element 1401 is glued to the baseplate 1403. Additionally, the cover 1404 is welded to the baseplate 1403. The current full permanent magnet element 1401 is a full block magnet and therefore nothing is reducing the eddy currents generated in the permanent magnet.

For reducing the eddy currents, as shown in FIG. 15 in a sectional view in the circumferential direction, the current permanent magnet 1500 (shown without the baseplate and the cover) is cut into four small magnetic pieces 1501 which are subsequently polished on all surfaces. Thereafter the four small magnetic pieces 1501 are glued back together by three glue layers 1505. Each glue layer 1505 is arranged between two adjacent small magnetic pieces 1501.

While gluing the small magnetic pieces 1501 together, the small magnetic pieces 1501 have to be kept in a fixture (not shown in FIG. 14 or FIG. 15) to get the desired shape of the finished current permanent magnet 1500. The steps of cutting, gluing and handling add extra costs to the final current permanent magnet.

Furthermore, coating the finished current permanent magnet may be difficult as the adhesive property of the surface of the small magnetic pieces and the glue layers are different. This may cause quality problems of the coating.

The manufacturing costs of a permanent magnet are crucial from the economic perspective of the permanent magnet machine. Further, the reliability of the permanent magnet is a key factor for the operational costs of the permanent magnet machine.

SUMMARY

An aspect relates to a simple and reliable permanent magnet for a permanent magnet machine which is able to reduce magnet eddy current losses.

According to a first aspect of embodiments of the present invention a permanent magnet for a permanent magnet machine is described. The permanent magnet comprises a base body having a first side and a second side which is an opposite side with respect to the first side. At least one first slit is formed in the base body such that the at least one first slit extends from the first side in the direction of the second side.

The base body is formed such that the base body comprises a first side and a second side, which are interconnected by a third side and a fourth side as well as a fifth side and a sixth side. The base body is formed monolithically as a one-piece element of a magnetic material. The first side and the second side are distanced from each other and delimit the base body in one dimension.

The slit may be formed in the base body by for example multi wire cutting, laser cutting, plasma cutting or autogenous gas cutting.

The number of necessary first slits may depend on a width of the base body. The width may be the dimension of the base body parallel to the first side and the second side, respectively.

The first slit extends from the first side in the direction of the second side and may be defined such that the first slit is opened to the first side and extends in the direction of the second side without an opening in the second side. Hence, the first slit may be a blind hole ending inside the base body.

According to a further aspect of embodiments of the present invention, a method of manufacturing a permanent magnet for a permanent magnet machine is disclosed. The method comprises providing a base body having a first side and a second side which is an opposite side with respect to the first side and forming at least one first slit in the base body, such that the at least one first slit extends from the first side in the direction of the second side.

Advantageously, the above-described permanent magnet may have lower manufacturing costs due to less handling and no necessary gluing process. Omitting the gluing process may have the further advantage that when no glue is used, there is no health risk during handling of the glue. Additionally, there may not be any quality problems with the coating not sticking to the different surfaces of the finished conventional magnet. Further, the lead time is reduced, and less production area is needed because of less production steps.

According to a further exemplary embodiment of the present invention, at least one further first slit is formed in the base body such that the at least one first slit and the at least one further first slit extend parallel to each other.

The at least one further first slit may be formed by the same method as the at least one first slit. Additionally, the at least one further first slit may extend from the first side in the direction of the second side and may be distanced from the at least one first slit.

The at least one further first slit may extend parallel to the at least one first slit. Additionally, the at least one further first slit and the at least one first slit may have the same depth. The depth of the further first slit or the first slit may be measured between a surface position on the first side where the first slit or the further first slit opens to the first side and the bottom of the first slit or the further first slit.

When the first slit or the further first slit is formed such that the slit extends straight between the surface position of the first side and the bottom, the depth may be defined as the extension of the first slit or the further first slit into the base body. When the first slit or the further first slit extends in a curved way, the depth may be defined as the shortest straight connection between the surface position and the bottom.

According to a further exemplary embodiment of the present invention, at least one second slit is formed in the base body such that the at least one second slit extends from the second side in the direction of the first side.

The at least one second slit may be formed by the same method as the at least one first slit. Additionally, the at least one second slit extends opposite to the at least one first slit. Hence, the at least one second slit opens on the opposite side than the at least one first slit, i.e. on the second side instead of on the first side.

The second slit extends from the second side in the direction of the first side may be defined such that the second slit is opened to the second side and extends in the direction of the first side without an opening in the first side. Hence, the first slit may be a blind hole ending inside the base body.

The at least one second slit may be formed to extend from the second side in the direction of the first side such that none of the at least one first slits or the at least one further first slits are interconnected with the at least one second slit inside the base body. Hence, none of the slits provided in the base body is formed such that it is a through hole which interconnects two different sides, as for example the first side and the second side.

According to a further exemplary embodiment of the present invention, the base body is formed such that the at least one first slit and the at least one second slit are arranged alternatingly in a direction which is parallel to the first side.

Being arranged alternatingly may describe that when the base body is formed with more than one first slit and more than one second slit, one first slit is arranged next to one or two of the second slits. Hence, except of the slits being formed next to the boundaries which interconnect the first side and the second side (seen in a cross-sectional view of the base body), each first slit is arranged between two second slits and each second slit is arranged between two first slits.

Therefore, for arranging alternatingly, the base body may be formed either with at least one first slit and at least two second slits or with at least one second slit and at least two first slits.

According to a further exemplary embodiment of the present invention, the base body is formed such that a sum of a depth of the at least one first slit and a depth of the at least one second slit is greater than a distance between the first side and the second side.

According to an alternative exemplary embodiment of the present invention, the base body is formed such that a sum of a depth of the at least one first slit and a depth of the at least one second slit is equal or smaller than a distance between the first side and the second side.

The depth of the at least one first slit may be defined depending on whether the first slit extends perpendicular to the first side/second side or angulated and not perpendicular to the first side/second side.

Additionally, the depth of the at least one first slit may be defined dependent on the strength of the magnetic field generated in the base body.

On the one hand, when the first slit extends perpendicular to the first side, the depth may be defined as a distance between an opening of the first slit on the first side and the bottom of the first slit inside the base body. Accordingly, when the second slit extends perpendicular to the second side, the depth may be defined as a distance between an opening of the second slit on the second side and the bottom of the second slit inside the base body.

On the other hand, when the first slit extends angulated and not perpendicular with respect to the first side, the depth may be defined as a distance between the bottom of the first slit inside the base body and the first side measured perpendicular to the first side. Accordingly, when the second slit extends angulated and not perpendicular to the second side, the depth may be defined as a distance between the bottom of the second slit inside the base body and the second side measured perpendicular to the second side.

Therefore, when there are formed more than one first slit in the base body, each of the first slits may have a different depth. Furthermore, when there are formed more than one second slit in the base body, each of the second slits may have a different depth.

The depth of one first slit and the depth of one adjacent second slit may be added to a respective sum which may be compared to the distance between the first side and the second side. When there is an uneven total number of first slits and second slits, always a first slit and an adjacent second slit may form the sum, even though one of the first slits or one of the second slits is added to two different sums.

Hence, one of the at least one first slit and one of the at least one second slit may form a pair of slits. The first slit and the second slit of the pair of slits are distanced from each other in a first direction being parallel to the first side. A middle position may be defined as the position which is in the geometrical middle in the first direction between the first slit and the second slit of the pair of slits. Further, the distance between the first side and the second side may be measured at the middle position and is the distance between the first side and the second side in a second direction being perpendicular to the first direction.

Therefore, seen in the second direction in a cross section having a normal being parallel to a third direction which is perpendicular to the first direction and the second direction, an extension of the first slit and an extension of the second slit overlap in the second direction.

As each of the at least one first slit and each of the at least one second slit may have a different depth in the second direction, a connecting line interconnecting the bottom point of each slit, may be formed as a zig-zag line.

According to a further exemplary embodiment of the present invention, the base body is formed such that the at least one first slit and/or the at least one second slit have the same depth in a direction extending from the first side to the second side.

According to an alternative exemplary embodiment of the present invention, the base body is formed such that the at least one first slit and the at least one second slit have different depths in a direction extending from the first side to the second side.

A different depth of the at least one first slit and the at least one second slit may be advantageous when the magnetic field generated near the first side and the magnetic field generated near the second side are of different strengths.

When the at least one first slit and the at least one second slit have the same depth in the direction extending from the first side to the second side, i.e. in the second direction as defined above, the bottom of each first slit is arranged on a first connecting line which is parallel to the first side. Correspondingly, the bottom of each second slit is arranged on a second connecting line which is parallel to the second side. The first connecting line is distanced from the second connecting line as the sum of the depth of the first slit and the depth of the second slit is greater than the distance between the first side and the second side as described in detail above.

At the same time, a distance between the first connecting line and the second side is smaller than a distance between the first connecting line and the first side. Accordingly, a distance between the second connecting line and the first side is smaller than a distance between the second connecting line and the second side as the sum of the depth of the first slit and the depth of the second slit is greater than the distance between the first side and the second side as described in detail above.

According to a further exemplary embodiment of the present invention, the base body is formed such that the at least one first slit extends perpendicular to the first side.

The at least one first slit extends parallel to the first side in the present application may be defined such that an extension of the shortest connection between the surface position where the first slit opens to the first side and the bottom of the first slit extends perpendicular to the curvature of the first side at the surface position where the first slit opens to the first side.

In a further exemplary embodiment, the base body may be formed such that the at least one second slit extends perpendicular to the second side.

Correspondingly, the at least one second slit extends perpendicular to the second side in the present application may be defined such that an extension of the shortest connection between the surface position where the second slit opens to the second side and the bottom of the second slit extends perpendicular to the curvature of the second side at the surface position where the second slit opens to the second side.

According to a further exemplary embodiment of the present invention, the base body is formed such that an angle is formed between the at least one first slit and the first side, and the angle is in the range of 0° and to 180°, particularly 45° to 135°.

In an exemplary embodiment, an extension of the first slit begins on the first side at a surface position where the first slit opens to the first side. At this surface position a tangent is applied on the contour of the curvature of the first side. In this exemplary embodiment, the first slit extends from the first side in the direction of the second side without any curvatures. Further, the first slit is a blind hole ending inside the base body and hence comprises a bottom. A connection line is defined from the surface position on the first side to the bottom. Between the connection line and the tangent an angle is defined, which is in the range of larger than 0° and smaller than 180°, i.e. 45° to 135°, particularly in the range of 65° to 115°, more particularly 90°.

In a further exemplary embodiment, the first slit extends from the first side in the direction of the second side in a curved way. In this embodiment, the connection line between the bottom and the surface position on the first side where the first slit cuts the first side, is the shortest connection between the two points. Analogously to the definition above, an angle is defined between the connection line and the tangent, which is in the range of 0° to 180°, i.e. 45° to 135°, particularly in the range of 65° to 115°, more particularly 90°.

Correspondingly, an extension of the second slit begins on the second side at a surface position where the second slit opens to the second side. At this surface position a tangent is applied on the contour of the curvature of the second side. In this exemplary embodiment, the second slit extends from the second side in the direction of the first side without any curvatures. Further, the second slit is a blind hole ending inside the base body and hence comprises a bottom. A connection line is defined from the surface position on the second side to the bottom. Between the connection line and the tangent an angle is defined, which is in the range of larger than 0° and smaller than 180°, i.e. 45° to 135°, particularly in the range of 65° to 115°, more particularly 90°.

According to a further exemplary embodiment of the present invention, the base body is formed such that the at least one first slit extends from the first side in the direction of the second side more than at least 1%, particularly at least 25%, more particularly more than 50%, even more particularly more than 80% of a distance between the first side and the second side.

The first slit extends from the first side in the direction of the second side more than 1% of the distance between the first side and the second side. The maximum depth of the slit may be limited by a minimal mechanical strength requirement, i.e. the minimal mechanical strength requirement to keep the necessary strength of the magnet. Therefore, the base body is still being held together without the need of additional glue.

The surface position on the first side where the first slit opens to the first side may be a first point. The first slit is formed as a blind hole in the base body, and the bottom of the blind hole may be a second point. A connection line between the first point and the second point may be defined as the shortest connection between the first point and the second point. The connection line may be virtually elongated such that a virtual cutting point of the connection line and the second side may be defined as a third point. Hence, the distance between the first side and the second side may be defined as the length between the first point and the third point.

According to a further exemplary embodiment, the first slit extends from the first side in the direction of the second side of for example 90% of the distance between the first side and the second side. Hence, on the first hand, the base body may still be held together by the 10% none-cut material of the base body and may be easily handled. On the other hand, the base body may be cut in the part in which the magnetic flux fluctuates the most.

Correspondingly, in a further exemplary embodiment, the base body may be formed such that the at least one second slit extends from the second side in the direction of the first side more than at least for example 90% of a distance between the second side and the first side.

Hence, by additionally providing the second slit, the 10% of the material which is not cut by the first slit may be cut instead by the second slit and at the same time due to the second slit being distanced to the first slit in the direction which is perpendicular to the first side, the base body is still be held together without the need of additional glue.

According to a further exemplary embodiment of the present invention, the at least one first slit is formed in the base body such that in a cross-section view of the base body the at least one first slit has a straight, saw-toothed and/or undulated shape.

The cross-section view may be defined as the sectional representation in which the first side and the second side are shown as a respective boundary line. Additionally, the first side and the second side are interconnected by the third side and the fourth side which in the cross-section view are also shown as a respective boundary line.

On the one hand, forming the first slit in the base body with a straight shape may have the advantage that the first slit may be easily formed by for example wire cutting, with little complexity for the equipment.

On the other hand, forming the first slit in the base body with an undulated shape may have the advantage that the absolute depth of the first slit inside the base body may be elongated compared to the depth of a straight shaped first slit.

Forming the first slit in the base body with a saw-toothed shape may be advantageously in view of the manufacturing and the elongated absolute depth, because the saw-toothed shape may be easily cut in the base body as the direction between two directions of the saw-toothed shape may be easily manufactured. At the same time the absolute depth of the saw-toothed shape is elongated compared to the depth of the straight shape.

According to a further exemplary embodiment of the present invention, the base body further comprises a third side and a fourth side which is an opposite side with respect to the third side, and the third side and the fourth side interconnect the first side and the second side. Further, at least one third slit is formed in the base body such that the at least one third slit extends from the third side in the direction of the fourth side.

The at least one third slit may be formed by the same method as the at least one first slit and/or the second slit. Additionally, the third slit may have the same shape as the first slit and/or the second slit.

The third slit extends from the third side in the direction of the fourth side may be defined such that the third slit is opened to the third side and extends in the direction of the fourth side without an opening in the fourth side. Hence, the third slit may be formed as a blind hole as defined above with respect to the first slit and/or the second slit.

An extension of the third slit and an extension of the first slit and an extension of the second slit, respectively, may not cut each other inside the base body because then a portion of the base body may no longer be connected with the remains of the base body.

Advantageously, the at least one third slit may prevent magnetic flux fluctuations which are not parallel to the first side but rather parallel to the third side, from propagating through the base body.

According to a further exemplary embodiment of the present invention, the at least one fourth slit is formed in the base body such that the at least one fourth slit extends from the fourth side in the direction of the third side.

The at least one fourth slit may be formed by the same method as the at least one third slit.

The fourth slit extends from the fourth side in the direction of the third side may be defined such that the fourth slit is opened to the fourth side and extends in the direction of the third side without an opening in the third side. Hence, the fourth slit may be formed as a blind hole as defined above with respect to the first slit and/or the second slit.

The at least one fourth slit and the at least one third slit may be formed to extend between the fourth side and the third side such that none of the at least one first slit and the at least one second slit is interconnected with the at least one fourth slit or the at least one third slit. Hence, none of the slits provided in the base body is formed such that it is a through hole connecting two different sides with each other.

According to a further exemplary embodiment of the present invention, the base body is formed such that the at least one third slit and/or the at least one fourth slit have the same depth in a direction extending from the third side to the fourth side.

When the at least one third slit and the at least one fourth slit have the same depth in the direction extending from the third side to the fourth side, i.e. in the first direction as defined above, the bottom of each third slit is arranged on a third connecting line which is parallel to the first side. Correspondingly, the bottom of each fourth slit is arranged on a fourth connecting line which is parallel to the second side. The third connecting line is distanced from the fourth connecting line as the sum of the depth of the third slit and the depth of the fourth slit is greater than the distance between the third side and the fourth side as described in detail above with reference to the first slit and the second slit.

At the same time, a distance between the third connecting line and the fourth side is smaller than a distance between the third connecting line and the third side. Accordingly, a distance between the fourth connecting line and the third side is smaller than a distance between the fourth connecting line and the fourth side as the sum of the depth of the third slit and the depth of the fourth slit is greater than the distance between the third side and the fourth side as described in detail above with reference to the first slit and the second slit.

According to an alternative embodiment of the invention, the base body is formed such that the at least one third slit and/or the at least one fourth slit have different depths in a direction extending from the third side to the fourth side.

A different depth of the at least one third slit and the at least one fourth slit may be advantageous when the magnetic field generated near the third side and the magnetic field generated near the fourth side are of different strengths.

According to a further exemplary embodiment of the present invention, a first direction is parallel to the first side, a second side is an opposite side with respect to the first side, and a third side and a fourth side interconnect the first side and the second side. Further, a second direction is parallel to the third side, and a third direction is perpendicular to the first direction and the second direction. Additionally, the at least one first slit extends entirely through the base body in the third direction.

The base body is formed such that the at least one first slit extends from one end face to another opposing end face being parallel to the one end face. Additionally, the base body is formed such that the at least one second slit extends entirely through the base body from the one end face to the other end face.

Furthermore, the base body is formed such that the at least one third slit and the at least one fourth slit extends entirely through the base body in the third direction.

According to a further aspect of embodiments of the present invention, a permanent magnet machine is disclosed. The permanent magnet machine comprises a permanent magnet as described above, and a component which generates a magnetic field.

The component generating a magnetic field may particularly be an electromagnetic coil.

The permanent magnet may be arranged such that a first side being parallel to the first direction, is parallel to the magnetic field lines generated by the permanent magnet machine. Preferably, the at least one first slit and the at least one second slit, respectively, extends perpendicular to the generated magnetic field lines.

According to a further exemplary embodiment of the present invention, the permanent magnet is arranged in the permanent magnet machine such that the magnetic field is providable perpendicular to an extension of the at least one first slit.

Hence, the magnetic flux fluctuations which may propagate parallel to the magnetic field lines are interrupted by the at least one first slit.

The number of first slits may depend on the size of the magnet and the frequency of the fluctuating magnetic flux.

According to a further exemplary embodiment of the present invention, a distance between adjacent slits depends on the strength of the fluctuating magnetic field.

Hence, advantageously, the number of first slits, second slits, third slits and fourth slits may depend on the size of the magnet and the frequency of the fluctuating magnetic flux. Furthermore, the orientation and the depth of the first slits, the second slits, the third slits and the fourth slits may be adapted on the strength of the magnetic field.

According to a further exemplary embodiment of the invention, at least one of the first side, the second side, the third side or the fourth side is shaped.

Being shaped means that the respective side seen in the cross-sectional view, is not a straight line but rather has any shape, as for example rounded, zig-zig or an arbitrary geometrical shape.

According to a further exemplary embodiment of the permanent magnet, the base body comprises a first part comprising the first side and a second part comprising the second side, wherein the first part has a first mounting surface which is mounted to a second mounting surface of the second part. The first part and the second part are structurally separated and are fixed together by welding or by gluing as described below. In particular, between the first part and the second part a layer of fixation material, such as glue, may be provided. Hence, by providing an additional layer between the first part and the second part, the reduction of eddy current losses becomes more effective.

According to a further exemplary embodiment of the permanent magnet between the first mounting surface and the second mounting surface a glue layer is arranged for gluing the first part and the second part together. As described above, because of the gluing layer between the first part and the second part, the reduction of eddy current losses becomes more effective.

According to a further exemplary embodiment of the method,
the base body comprises a first part comprising the first side and a second part comprising the second side, wherein the first part has a first mounting surface which is mounted to a second mounting surface of the second part. Before the step of forming the at least one first slit the method comprises gluing the first mounting surface and the second mounting surface together for forming the base body and for providing a glue layer between the first part and the second part.

Hence, the reduction of eddy current losses becomes more effective and thereby losses are lower leading to a lower mecca temperature and the higher performance and efficiency. Specifically, by making the base body in two separate parts (layers) the benefit of splitting is maximised as the eddy currents cannot flow between the lower first part and the upper second part. The gluing of one part (layer) is much more cost-effective than making the magnet in small pieces by slitting and there after gluing the small pieces together.

It has to be noted that embodiments of the invention have been described with reference to different subject-matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject-matter also any combination between features relating to different subject-matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein:

FIG. 1 shows a cross-sectional view of a permanent magnet comprising three first slits according to an exemplary embodiment;

FIG. 2 shows a cross-sectional view of a permanent magnet comprising three first slits and four second slits according to an exemplary embodiment;

FIG. 12 shows a cross-sectional view of a permanent magnet comprising six first slits according to an exemplary embodiment;

FIG. 13 shows a cross-sectional view of a permanent magnet comprising five first slits and three second slits according to an exemplary embodiment;

DETAILED DESCRIPTION

Figure 3:
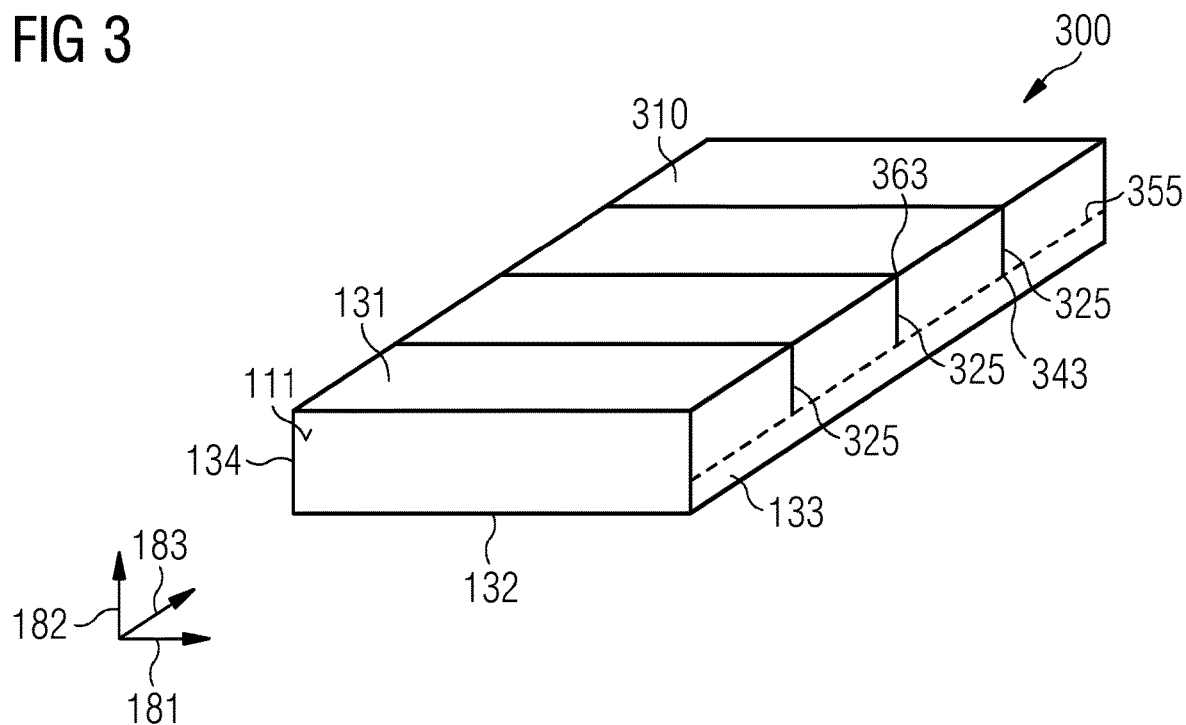
FIG. 3 shows a cross-sectional view of a permanent magnet comprising three fifth slits according to an exemplary embodiment.

The illustrations in the drawings are schematically. It is noted that in different figures, similar or identical elements are provided with the same reference signs.

FIG. 1 shows a cross-sectional view of a permanent magnet 100 comprising three first slits 121 according to an exemplary embodiment.

The permanent magnet 100 comprises a base body 110 in which three first slits 121 are formed. The three first slits 121 extend parallel to each other from a first side 131 in the direction of a second side 132. Further, the second side 132 is an opposite side of the first side 131 and is distanced from the first side 131 in a second direction 182 and is interconnected with the first side 131 by a third side 133 and a fourth side 134, respectively.

The base body 110 comprises a first end face 111 which is shown in FIG. 1 and a second end face (not shown in FIG. 1) distanced from the first end face 111 in a third direction 183 and being identical and parallel to the first end face 111.

The three first slits 121 are each formed as blind holes ending in the base body 110. As exemplarily shown in FIG. 1 only on one first slit 121, each of the three first slits 121 comprises a first end 141 of the first slit 121. The first end 141 of the first slit 121 is a bottom of the blind hole at which the first slit 121 ends inside the base body 110. Additionally, each of the three first slits 121 comprises a second end 161 of the first slit 121 where the first slit 121 opens to the first side 131.

In the exemplary embodiment shown in FIG. 1, the three first slits 121 have an identical depth. However, the first slits may have a different length as may be seen in FIGS. 10 to 13. Hence, the three first ends 141 of the first slit 121 are arranged on a first connecting line 151 of the first slits 121 which is distanced to the first side 131 and to the second side 132. In this exemplarily embodiment, a distance between the second side 132 and the first connecting line 151 of the first slits 121 is smaller than a distance between the first side 131 and the first connecting line 151 of the first slits 121. However, it may be understood that a distance between the second side 132 and the first connecting line 151 of the first slits 121 could be equal or larger than a distance between the first side 131 and the first connecting line 151 of the first slits 121 (not shown in FIG. 1). Furthermore, the first connecting line 151 of the first slits 121 is parallel to the first side 131 and the second side 132, respectively.

FIG. 2 shows a cross-sectional view of the permanent magnet 200 comprising three first slits 121 and four second slits 222 according to an exemplary embodiment.

The base body 110 is formed with four second slits 222. Seen in the first direction 181 from the fourth side 134 to the third side 133, there is a first second slit 222, a first first slit 121, a second second slit 222, a second first slit 121, a third second slit 222, a third first slit 121 and a fourth second slit 222. A total distance in the first direction 181 is the length between the fourth side 134 and the third side 133. The four second slits 222 and the three first slits 121 are formed in the base body 210 such that a distance between the fourth side 134 and the first second slit 222, a distance between the fourth second slit 222 and the third side 133, and a distance between a second slit 222 and an adjacent first slit 121, are equal.

The three first slits 121 are formed identical to the three first slits in FIG. 1. The four second slits 222 are each formed as blind holes ending inside the base body 210. As exemplarily shown in FIG. 2 only on one second slit 222, each of the four second slits 222 comprises a first end 242 of the second slit 222. The first end 242 of the second slit 222 is a bottom of the blind hole at which the second slit 121 ends in the base body 210. Additionally, each of the four second slits 222 comprises a second end 262 of the second slit 222 where the second slit 222 opens to the second side 132.

The four second slits 222 have an identical depth. However, the second slits may have a different length as shown in FIG. 13. Hence, the four second ends 242 of the second slits 222 are arranged on a second connecting line 252 of the second slits 222 which is distanced to the first side 131 and to the second side 132. In this exemplarily embodiment, a distance between the first side 131 and the second connecting line 252 of the second slits 222 is smaller than a distance between the second side 132 and the second connecting line 252 of the second slits 222. However, it may be understood that a distance between the second side 132 and the first connecting line 151 of the first slits 121 could be equal or larger than a distance between the first side 131 and the first connecting line 151 of the first slits 121 (not shown in FIG. 2). Furthermore, the second connecting line 252 of the second slits 222 is parallel to the first side 131 and the second side 132, respectively.

Each of the four second slits 222 extends in the third direction 183 through the entire base body 210 from the first end surface 111 to a second end surface (not shown in FIG. 2) being an opposite surface and equal to the first end surface 111.

The three first slits 121 and the four second slits 222 extend parallel to each other and extend such that they never cross each other or are connected in any way.

FIG. 3 shows a cross-sectional view of a permanent magnet 300 comprising three fifth slits 325 according to an exemplary embodiment.

The base body 310 is formed with three fifth slits 325 each extending from the third side 133 to the fourth side 134 such that the three fifth slits 325 are opened to the first side 131.

The three fifth slits 325 are each formed as blind holes in the base body 310. As exemplarily shown in FIG. 3 only on one fifth slit 325, each of the three fifth slits 325 comprises a first end 343 of the fifth slit 325. The first end 343 of the fifth slit 325 is a bottom of the blind hole at which the fifth slit 325 ends inside the base body 310. Additionally, each of the three fifth slits 325 comprises a second end 363 of the fifth slit 325 where the fifth slit 325 opens to the first side 131.

The three fifth slits 325 have an identical depth. However, the third slits may have a different depth (not shown in FIG. 3). Hence, the three second ends 343 of the fifth slits 325 are arranged on a first connecting line 355 of the fifth slits 325 which is distanced to the second side 132 and to the first side 131. A distance between the second side 132 and the first connecting line 355 of the fifth slits 325 is smaller than a distance between the first side 131 and the first connecting line 355 of the fifth slits 325. However, it may be understood that a distance between the second side 132 and the first connecting line 355 of the fifth slits 325 could also be equal or larger than a distance between the first side 131 and the first connecting line 355 of the fifth slits 325 (not shown in FIG. 3).

Each of the three fifth slits 325 extends entirely through the base body 310 from the third side 133 to the fourth side 134.

Figure 4:
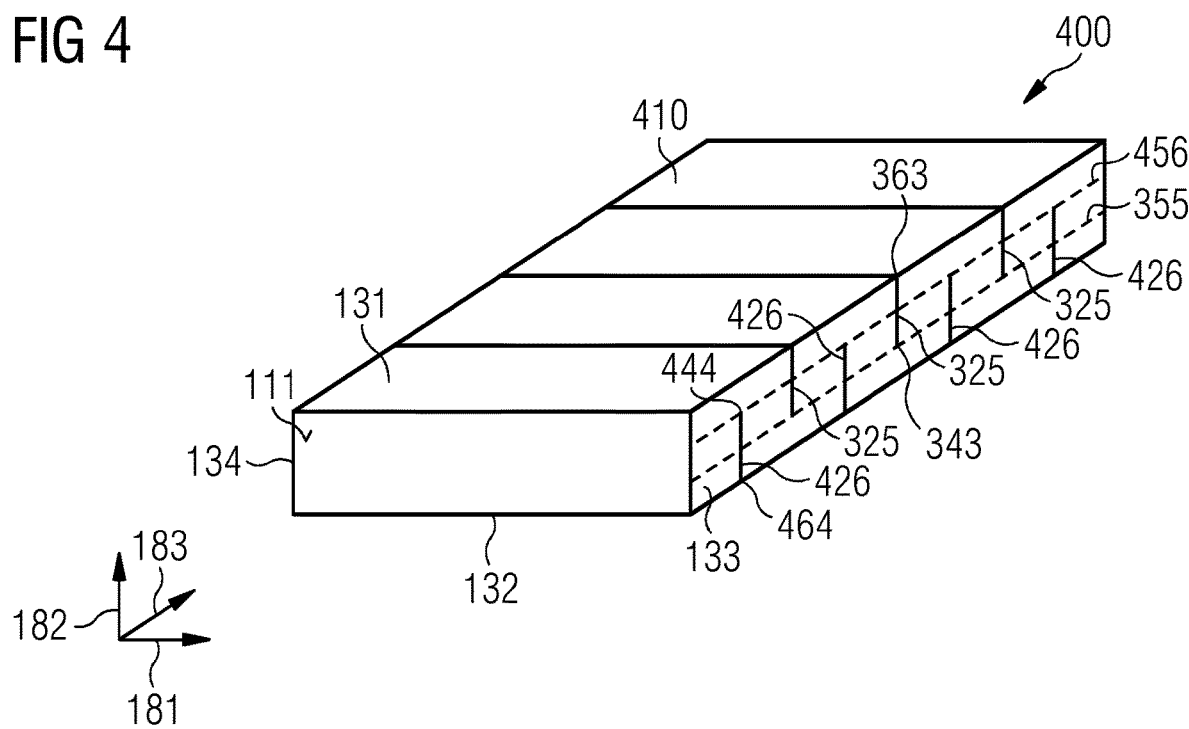
FIG. 4 shows a cross-sectional view of a permanent magnet comprising three fifth slits and four sixth slits according to an exemplary embodiment.

FIG. 4 shows a cross-sectional view of a permanent magnet 400 comprising three fifth slits 325 and four sixth slits 426 according to an exemplary embodiment.

The base body 410 is formed with three fifth slits 325 and four sixth slits 426. Seen in the third direction 183 from the first end surface 111 to the second end surface, there is a first sixth slit 426, a first fifth slit 325, a second sixth slit 426, a second fifth slit 325, a third sixth slit 426, a third fifth slit 325 and a fourth sixth slit 426. A total distance in the third direction 183 is the length between the first end surface 111 and the second end surface being parallel to the first end surface 111. The four sixth slits 426 and the three fifth slits 325 are formed in the base body 410 such that a distance between the first end surface 111 and the first sixth slit 426, a distance between the fourth sixth slit 426 and the second end surface, and a distance between a sixth slit 426 and an adjacent fifth slit 325, are equal. However, the distance between the fourth sixth slit 426 and the second end surface, and a distance between a sixth slit 426 and an adjacent fifth slit 325 may be different (not shown in FIG. 4).

The three fifth slits 325 and the four sixth slits 426 are each formed as respective blind holes in the base body 410. As exemplarily shown in FIG. 4 only on one sixth slit 426, each of the four sixth slits 426 comprises a first end 444 of the sixth slit 426. The first end 444 of the sixth slit 426 is a bottom of the blind hole at which the sixth slit 426 ends inside the base body 410. Additionally, each of the four sixth slits 426 comprises a second end 464 of the sixth slit 426 where the sixth slit 426 opens to the first side 131.

The four sixth slits 426 have an identical depth. Hence, the four second ends 444 of the sixth slits 426 are arranged on a second connecting line 456 of the sixth slits 426 which is distanced to the first side 131 and to the second side 132. A distance between the first side 131 and the second connecting line 456 of the sixth slits 426 is smaller than a distance between the second side 132 and the second connecting line 456 of the sixth slits 426. However, the distance between the first side 131 and the second connecting line 456 of the sixth slits 426 may also be identical or larger than the distance between the second side 132 and the second connecting line 456 of the sixth slits 426 (not shown in FIG. 4). Furthermore, the second connecting line 456 of the sixth slits 426 is parallel to the first side 131 and the second side 132, respectively. Additionally, seen in the second direction 182 from the second side 132 to the first side 131, there is the second side 132, the first connecting line 355 of the fifth slits 325, the second connecting line 456 of the sixth slits 426 and the first side 131, each extending parallel to each other.

Each of the four sixth slits 426 extends in the first direction 181 through the entire base body 410 from the third side 133 to the fourth side 134 being an opposite surface and equal to the third side 133.

The three fifth slits 325 and the four sixth slits 426 extend parallel to each other and extend such that they never cross each other or are connected in any way.

Figure 5:
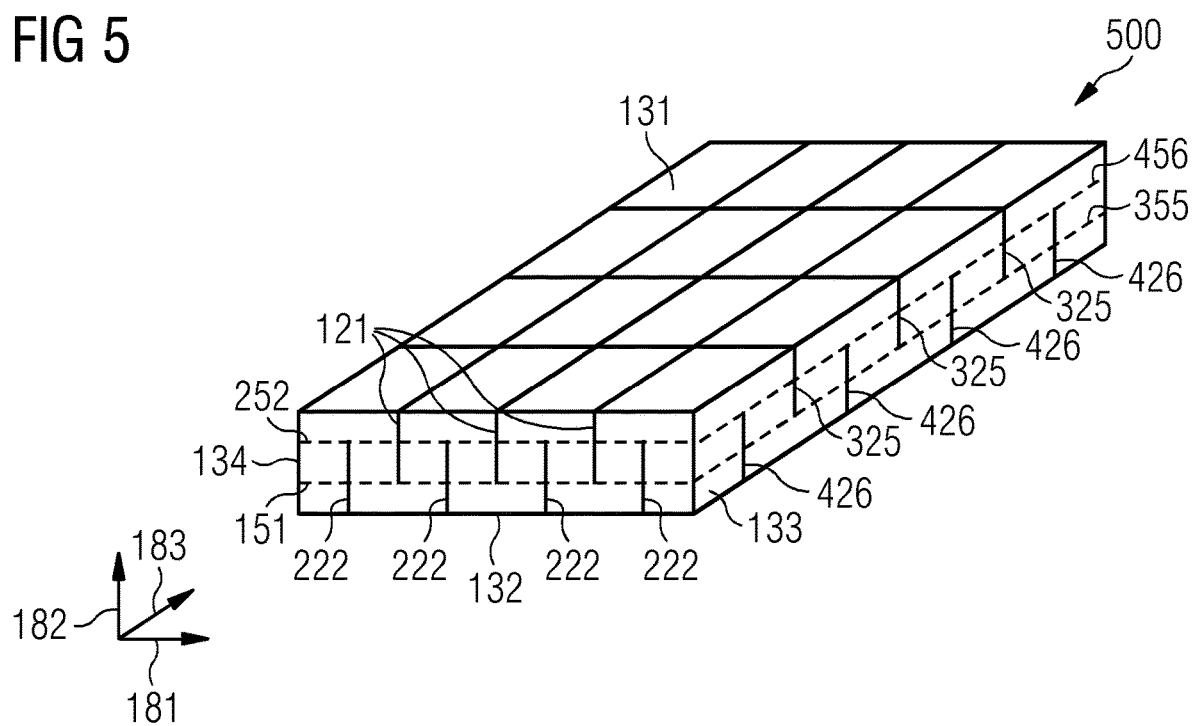
FIG. 5 shows a cross-sectional view of a permanent magnet comprising three first slits, four second slits, three fifth slits and four sixth slits according to an exemplary embodiment.

FIG. 5 shows a cross-sectional view of a permanent magnet 500 comprising three first slits 121, four second slits 222, three fifth slits 325 and four sixth slits 426 according to an exemplary embodiment.

The three first slits 121 and the four second slits 222 are formed as described in connection with FIG. 1 and FIG. 2. The three fifth slits 325 and the four sixth slits 426 are formed as described in connection with FIG. 3 and FIG. 4.

A distance between the first connecting line 151 of the first slits 121 and the second side 132 is equal to a distance between the first connecting line 355 of the fifth slits 325 and the second side 132. However, it may be understood that the distance between the first connecting line 151 of the first slits 121 and the second side 132 may also be equal to or larger than the distance between the first connecting line 355 of the fifth slits 325 and the second side 132 (not shown in FIG. 5). Correspondingly, a distance between the second connecting line 252 of the second slits 222 and the first side 131 is equal to a distance between the second connecting line 456 of the sixth slits 426 and the first side 131.

Further, each of the four sixth slits 426 squares each of the four second slits 222 and each of the three first slits 121 squares each of the three fifth slits 325. Hence, losses due to the fluctuating magnetic flux are further decreased.

Figure 6:
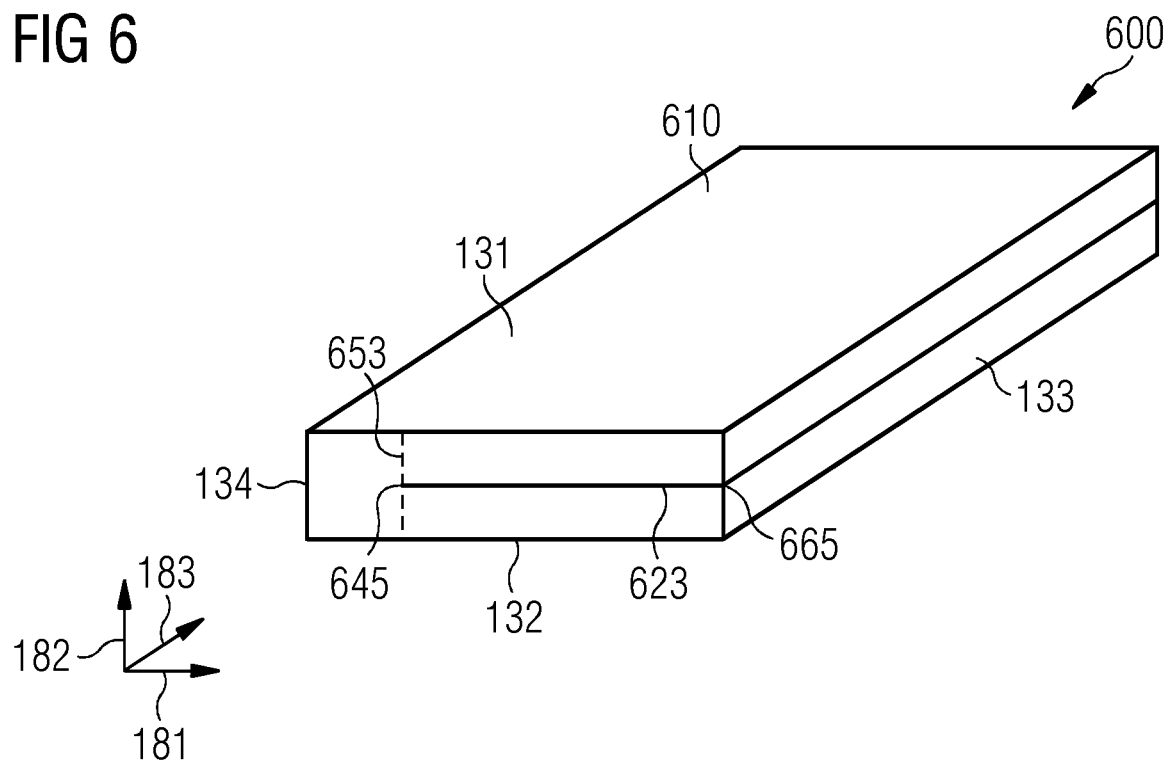
FIG. 6 shows a cross-sectional view of a permanent magnet comprising one third slit according to an exemplary embodiment.

FIG. 6 shows a cross-sectional view of a permanent magnet 600 comprising one third slit 623 according to an exemplary embodiment.

The permanent magnet 600 comprises a base body 610 in which one third slit 623 is formed. The third slit 623 extends from a third side 133 in the direction of the fourth side 134 and perpendicular to the third side 133. Further, the third slit 623 opens to the third side 133.

The third slit 623 is formed as a blind hole ending inside the base body 610. As shown in FIG. 6, the third slit 623 comprises a first end 645 of the third slit 623. The first end 645 of the third slit 623 is a bottom of the blind hole at which the third slit 623 ends inside the base body 610. Additionally, the third slit 623 comprises a second end 665 of the third slit 623 where the third slit 623 opens to the third side 133.

The third slit 623 has a depth which is identical to a distance between the third side 133 and a first connecting line 653 of the third slit 623 being defined perpendicular to the first side 131 and running through a position in the first direction 181 where the first end 645 of the third slit 623 is. The first connecting line 653 of the third slit 623 is distanced to the third side 133 and to the fourth side 134. A distance between the fourth side 134 and the first connecting line 653 of the third slit 623 is smaller than a distance between the third side 133 and the first connecting line 653 of the third slit 623. However, it may be understood that the distance between the fourth side 134 and the first connecting line 653 of the third slit 623 may also be equal to or larger than the distance between the third side 133 and the first connecting line 653 of the third slit 623 (not shown in FIG. 6). Furthermore, the first connecting line 653 of the third slit 623 is parallel to the third side 133 and the fourth side 134, respectively.

Figure 7:
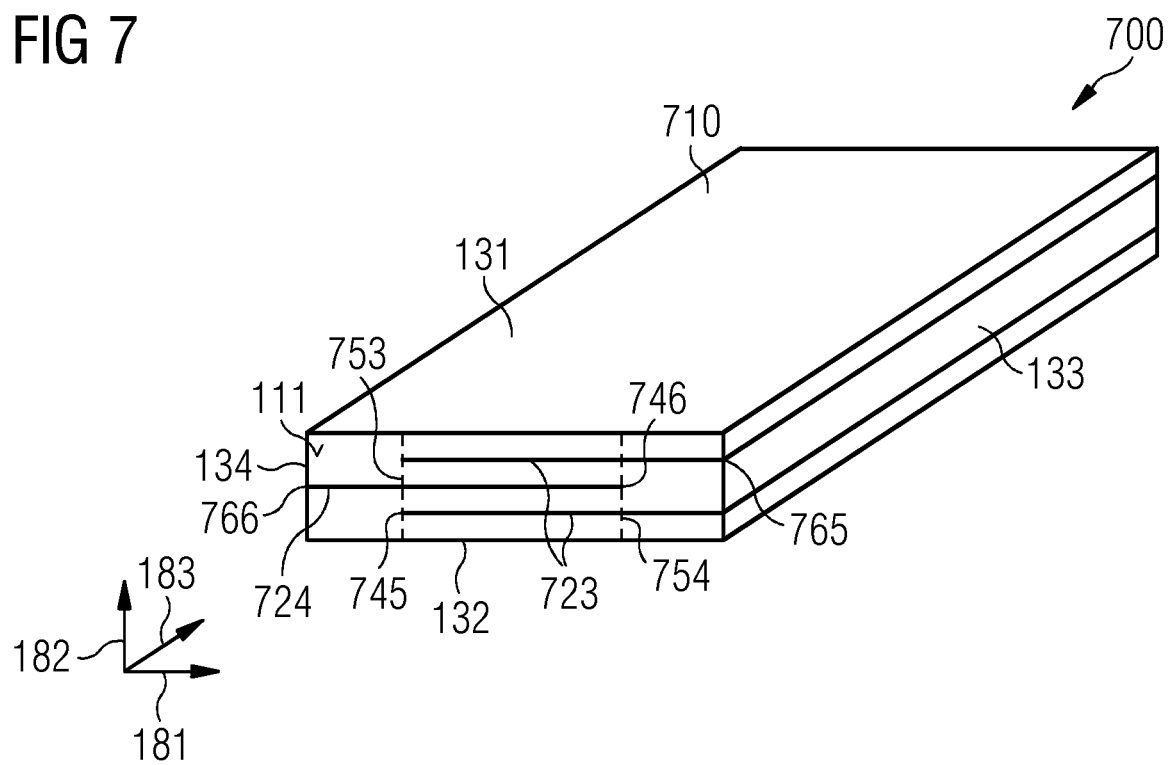
FIG. 7 shows a cross-sectional view of a permanent magnet comprising two third slits and one fourth slit according to an exemplary embodiment.

FIG. 7 shows a cross-sectional view of a permanent magnet 700 comprising two third slits 723 and one fourth slit 724 according to an exemplary embodiment.

The permanent magnet 700 comprises a base body 710 in which two third slits 723 are formed. The two third slits 723 extend parallel to each other from a third side 133 in the direction of the fourth side 134.

The two third slits 723 are both formed as blind holes ending in the base body 710. As exemplarily shown in FIG. 7 only on one of the two third slits 723, both third slits 723 comprise a first end 745 of the third slit 723. The first end 745 of the third slit 723 is a bottom of the blind hole at which the third slit 723 ends in the base body 710. Additionally, both third slits 723 comprises a second end 765 of the third slit 723 where the third slit 723 opens to the third side 133.

The two third slits 723 have an identical depth. Hence, the two first ends 745 of the third slits 723 are arranged on a first connecting line 753 of the third slits 723 which is distanced to the fourth side 134 and to the third side 133. A distance between the fourth side 134 and the first connecting line 753 of the third slits 723 is smaller than a distance between the third side 133 and the first connecting line 753 of the third slits 723. However, it may be understood that the distance between the fourth side 134 and the first connecting line 753 of the third slits 723 may also be equal to or larger than a distance between the third side 133 and the first connecting line 753 of the third slits 723 (not shown in FIG. 7). Furthermore, the first connecting line 753 of the third slits 723 is parallel to the third side 133 and the fourth side 134, respectively.

Additionally, one fourth slit 724 is formed in the base body 710. Seen in the second direction 182 from the second side 132 to the first side 131, there is the first third slit 723, the fourth slit 724 and the second third slit 723. A total distance in the second direction 182 is the length between the first side 131 and the second side 132. The fourth slit 724 and the two third slits 723 are formed in the base body 710 such that a distance between the second side 132 and the first fourth slit 724, a distance between the second fourth slit 724 and the first side 131, and a distance between the fourth slit 724 and each of the two third slits 723, are equal.

The fourth slit 724 is formed as a blind hole in the base body 710. As shown in FIG. 7, the fourth slit 724 comprises a first end 746 of the fourth slit 724. The first end 746 of the fourth slit 724 is a bottom at which the fourth slit 724 ends in the base body 710. A second connecting line 754 of the fourth slit 724 is perpendicular to the first side 131 and runs through the first end 746 of the fourth slit 724. Additionally, the fourth slit 724 comprises a second end 766 of the fourth slit 724 where the fourth slit 724 opens to the fourth side 134. Additionally, the second connecting line 754 of the fourth slit 724 is distanced to the third side 133 and to the fourth side 134. A distance between the third side 133 and the second connecting line 754 of the fourth slit 724 is smaller than a distance between the fourth side 134 and the second connecting line 754 of the fourth slit 724. However, it may be understood that the distance between the third side 133 and the second connecting line 754 of the fourth slit 724 may also be equal to or larger than the distance between the fourth side 134 and the second connecting line 754 of the fourth slit 724 (not shown in FIG. 7). Furthermore, the second connecting line 754 of the fourth slit 724 is parallel to the first connecting line 753.

The fourth slit 724 extends in the third direction 183 through the entire base body 710 from the first end surface 111 to a second end surface (not shown in FIG. 7) being an opposite surface and equal to the first end surface 111.

The fourth slit 724 and the two third slits 723 extend parallel to each other and extend such that they never cross each other or are connected in any way.

Figure 8:
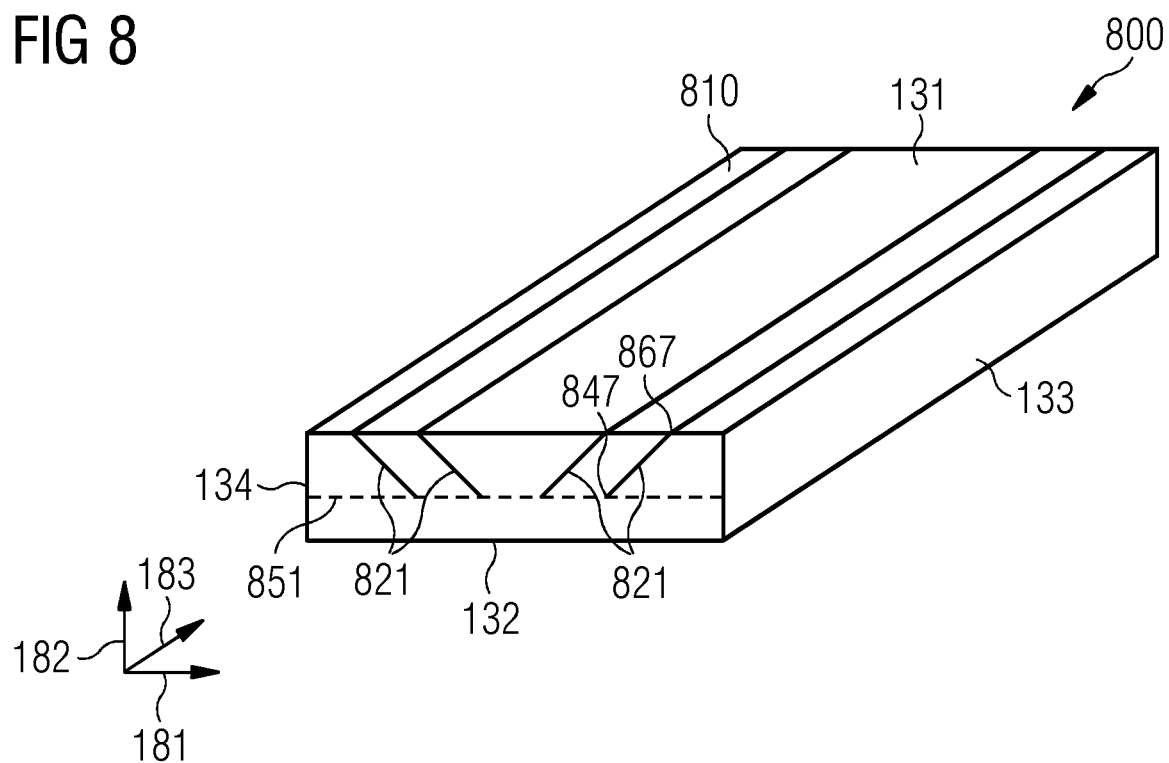
FIG. 8 shows a cross-sectional view of a permanent magnet comprising four first slits according to a further exemplary embodiment.

FIG. 8 shows a cross-sectional view of a permanent magnet 800 comprising four first slits 821 according to a further exemplary embodiment.

Four first slits 821 are formed in the base body 810 such that the four first slits 821 extend from the first side 131 in the direction of the second side 132. Each of the first slits 821 have an extension which is angulated to the first side 131. Two of the first slits 821 are angulated such that a pointed angle is defined between the first side 131 and the first slit 821 in the direction of the third side 133. The other two first slits 821 are angulated such that a pointed angle is defined between the first side 131 and the first slit 821 in the direction of the fourth side 134. Each of the first slits 821 is formed as a blind hole ending inside the base body 810. A bottom of each blind hole defines a first end 847 of the first slit 821. Additionally, each first slit 821 comprises a second end 867 of the first slit 821 where the first slit 821 opens to the first side 131.

Furthermore, the four first slits 821 have an identical depth, hence the four first ends 847 are arranged on a first connecting line 851 of the first slits 821 which is distanced to the first side 131 and the second side 132, respectively. However, it may be understood that the four first slits 821 may have a different length (not shown in FIG. 8). A distance between the first connecting line 851 of the first slits 821 and the second side 132 is slightly smaller than a distance between the first connecting line 851 of the first slits 821 and the first side 131. However, it may be understood that the distance between the first connecting line 851 of the first slits 821 and the second side 132 may be equal to or larger than the distance between the first connecting line 851 of the first slits 821 and the first side 131 (not shown in FIG. 8).

Additionally, each of the first slits 821 extends entirely through the base body 810 from a first end surface 111 to a second end surface being the opposite surface and being formed identical and parallel to the first end surface 111.

Figure 9:
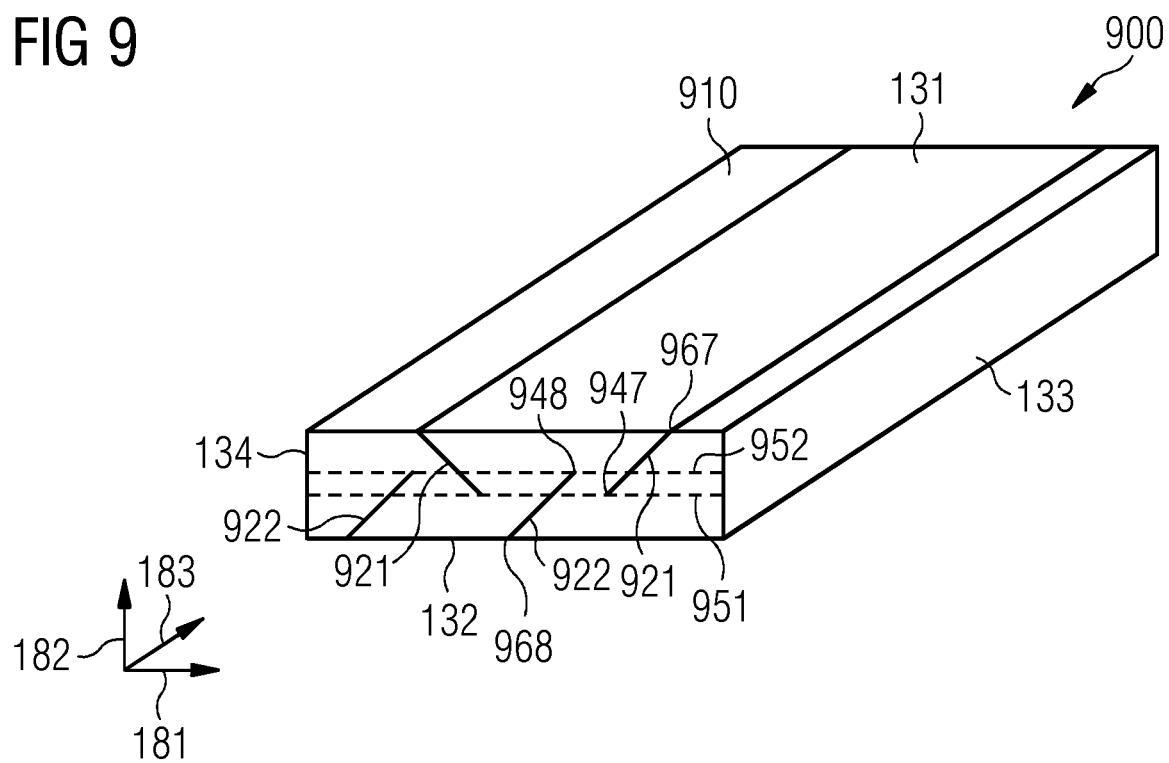
FIG. 9 shows a cross-sectional view of a permanent magnet comprising two first slits and two second slits according to a further exemplary embodiment.

FIG. 9 shows a cross-sectional view of a permanent magnet 900 comprising two first slits 921 and two second slits 922 according to a further exemplary embodiment.

Two first slits 921 and two second slits 922 are formed in the base body 910. The two first slits 921 extend from the first side 131 in the direction of the second side 132 and are angulated relatively to the first side 131. A pointed angle between the first side 131 and an extension of one of the two first slits 921 is in the direction of the third side 133 and a pointed angle between the first side 131 and an extension of the other one of the two first slits 921 is in the direction of the fourth side 134. Each first slit 921 comprises a first end 947 of the first slit 921 which is the bottom of the blind hole forming the first slit 921. Additionally, each of the two first slits 921 comprises a second end 967 of the first slit 921 where the respective first slit 921 opens to the first side 131. Hence, a distance between the two first ends 947 of the first slit 921 in the first direction 181 is smaller than a distance of the two second ends 967 of the first slit 921 in the first direction 181. However, it may be understood, that the distance between the two first ends 947 of the first slit 921 in the first direction 181 may also be equal to or larger than the distance of the two second ends 967 of the first slits 921 in the first direction 181 (not shown in FIG. 9).

Furthermore, two second slits 922 are formed in the base body 910 such that the second slits 922 extend from the second side 132 in the direction of the first side 131 in the second direction 182. The extensions of the two second slits 922 are angulated relatively to the second side 132 and are at the same time parallel to the respective other second slit 922.

Each of the two second slits 922 comprises a first end 948 of the second slit 922 being the bottom of the blind hole at which each second slit 922 ends inside the base body 910, and a second end 968 of the second slit 922 where the second slit 922 opens to the second side 132. The two first ends 948 of the second slit 922 are arranged on a second connecting line 952 of the second slits 922 which is parallel to the first connecting line 951 of the first slits 921 and the first side 131. A distance between the second connecting line 952 of the second slits 922 and the first side 131 is smaller than a distance between the second connecting line 952 of the second slits 922 and the second side 132 in the second direction 182.

Seen in the first direction 181 between the fourth side 134 and the third side 133, there are arranged a first second slit 922, a first first slit 921, a second second slit 922 and a second first slit 921, adjacent to each other.

Figure 10:
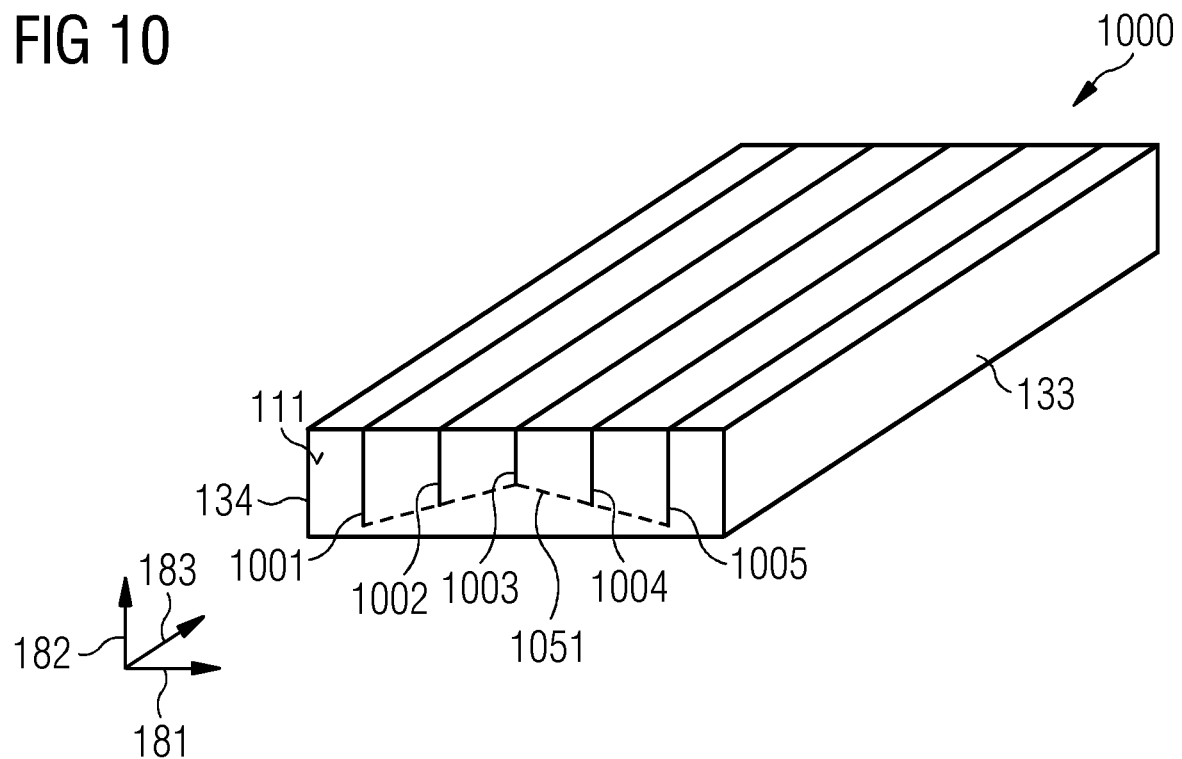
FIG. 10 shows a cross-sectional view of a permanent magnet comprising five first slits according to an exemplary embodiment.

FIG. 10 shows a cross-sectional view of a permanent magnet 1000 comprising five first slits 1001, 1002, 1003, 1004, 1005 according to a further exemplary embodiment.

Seen in the first direction 181 from the fourth side 134 to the third side 133, there is arranged the first first slit 1001, the second first slit 1002, the third first slit 1003, the fourth first slit 1004 and the fifth first slit 1005.

The first depth of the first first slit 1001 is larger than the second depth of the second first slit 1002, the third depth of the third first slit 1003 and the fourth depth of the fourth first slit 1004, and equal to the fifth depth of the fifth first slit 1005. The second depth of the second first slit 1002 is larger than the third depth of the third first slit 1003, and equal to the fourth depth of the fourth first slit 1004.

Hence, a connecting line 1051 connecting the bottom of each of the first slits with each other is shaped as a triangle.

Figure 11:
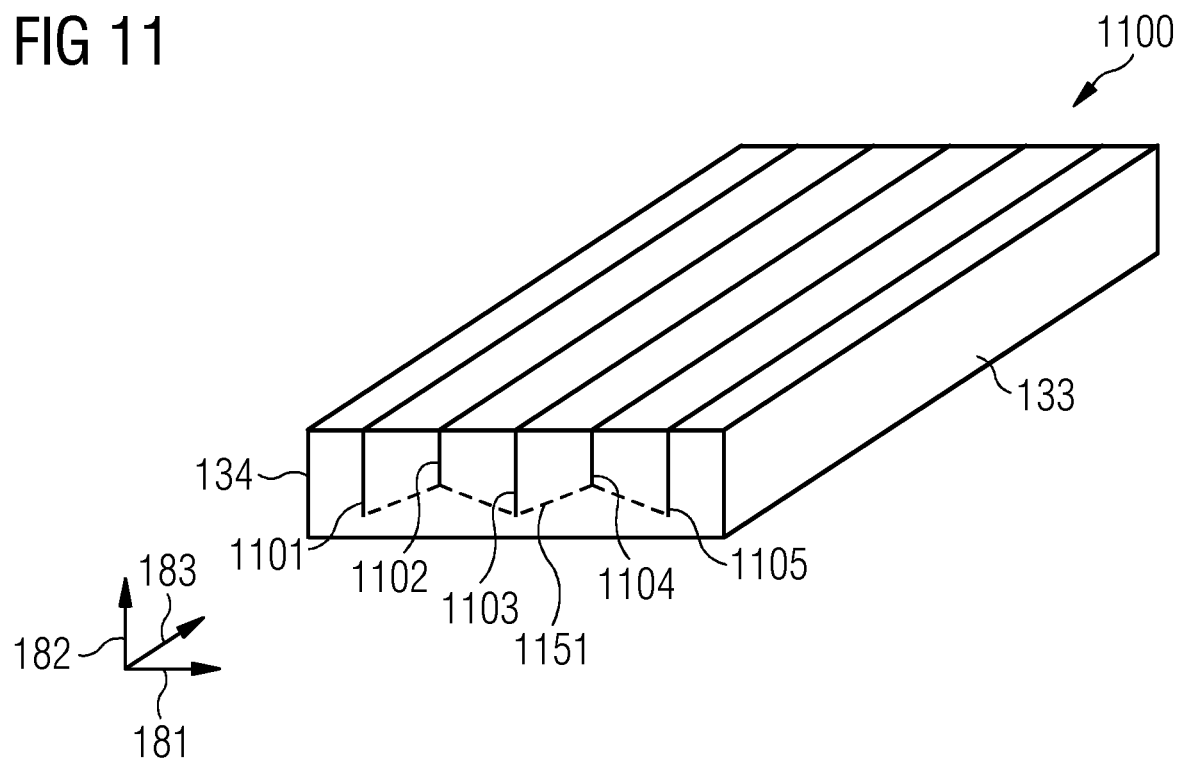
FIG. 11 shows a cross-sectional view of a permanent magnet comprising five first slits according to a further exemplary embodiment.
Figure 14:
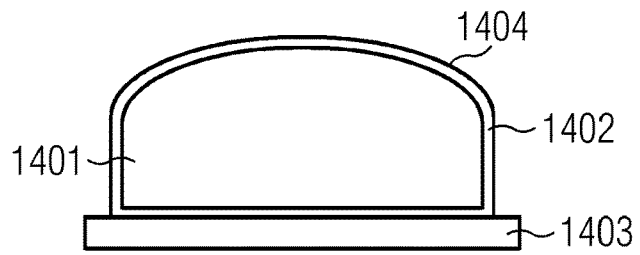
FIG. 14 shows a sectional view in the axial direction of a current full permanent magnet element according to the prior art.
Figure 15:
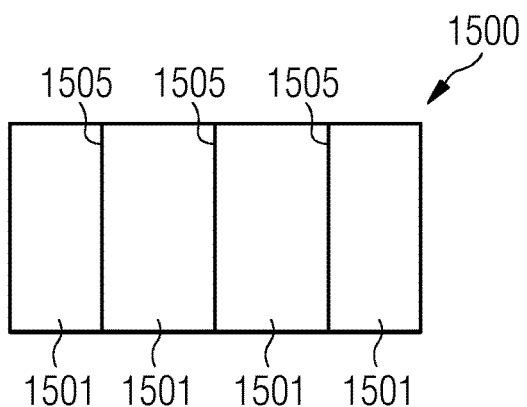
FIG. 15 shows a sectional view in the circumferential direction of a current full permanent magnet element according to the prior art.

FIG. 11 shows a cross-sectional view of a permanent magnet 1100 comprising five first slits 1101, 1102, 1103, 1104, 1105 according to a further exemplary embodiment.

Seen in the first direction 181 from the fourth side 134 to the third side 133, there is arranged the first first slit 1101, the second first slit 1102, the third first slit 1103, the fourth first slit 1104 and the fifth first slit 1105.

The first depth of the first first slit 1101 is equal to the third depth of the third first slit 1103 and the fifth depth of the fifth first slit 1105. The second depth of the second first slit 1102 is equal to the fourth depth of the fourth first slit 1104, and smaller than the first depth of the first first slit 1101.

Hence, a connecting line 1151 connecting the bottom of each of the first slits 1101, 1102, 1103, 1104 and 1105 with each other has the shape of a zig-zag line.

FIG. 12 shows a cross-sectional view of a permanent magnet 1200 comprising six first slits 1201, 1202, 1203, 1204, 1205, 1206 according to a further exemplary embodiment.

Seen in the first direction 181 from the fourth side 134 to the third side 133, the six first slits 1201, 1202, 1203, 1204, 1205, and 1206 are arranged in an order dependent on their increasing depth. Therefore, the first depth of the first first slit 1201 is smaller than the second depth of the second first slit 1202. The second depth of the second first slit 1202 is smaller than the third depth of the third first slit 1203. The third depth of the third first slit 1203 is smaller than the fourth depth of the fourth first slit 1204. The fourth depth of the fourth first slit 1204 is smaller than the fifth depth of the fifth first slit 1205. Furthermore, the fifth depth of the fifth first slit 1205 is smaller than the sixth depth of the sixth first slit 1206.

Hence, a connecting line 1251 connecting the bottom of each of the first slits 1201, 1202, 1203, 1204, 1205, and 1206 with each other has the shape of a straight line having an inclination relatively to the first side 131.

FIG. 13 shows a cross-sectional view of a permanent magnet 1300 comprising five first slits 1301, 1302, 1303, 1304, 1305 and three second slits 1311, 1312, 1313 according to a further exemplary embodiment.

Seen in the first direction 181 from the fourth side 134 to the third side 133, there is arranged the first first slit 1301, the first second slit 1311, the second first slit 1302, the second second slit 1312, the third first slit 1303, the fourth first slit 1304, the third second slit 1313 and the fifth first slit 1305.

Hence, a first connecting line 1351 connecting the bottom of each of the first slits 1301, 1302, 1303, 1304, and 1305 with each other has the shape of a straight line having an inclination relatively to the first side 131 and the second side 132, respectively. Additionally, a second connecting line 1352 connecting the bottom of each of the second slits 1311, 1312, and 1313 with each other has the shape of a parabola.

Figure 16:
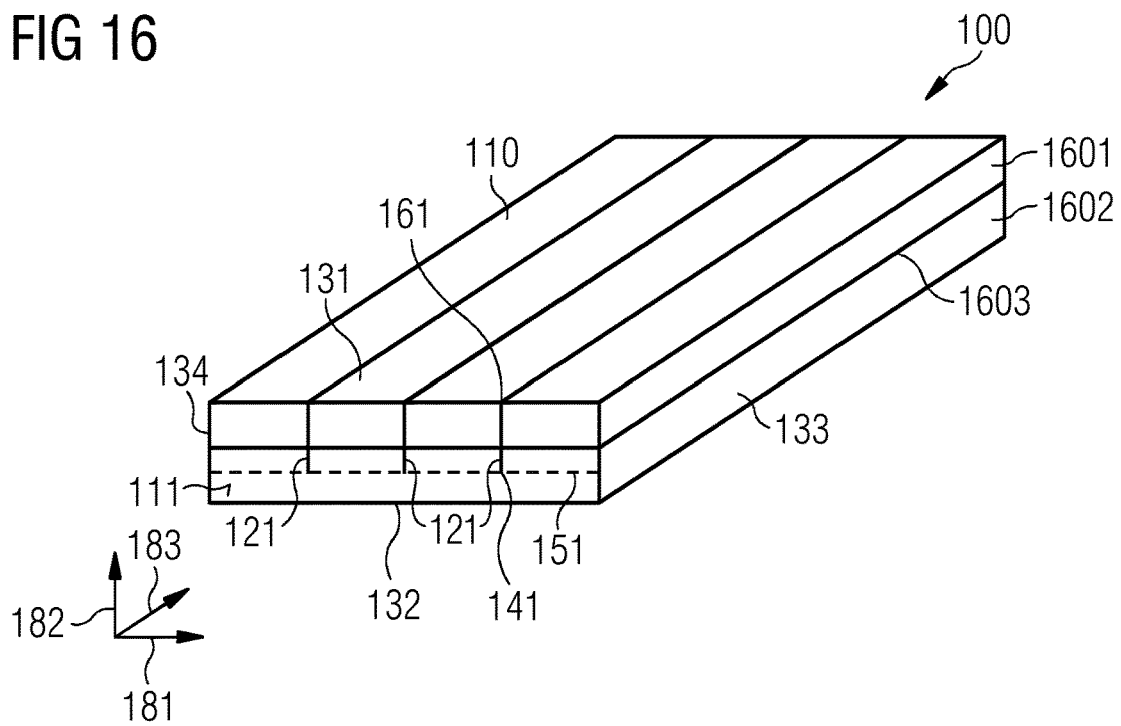
FIG. 16 shows a cross-sectional view of a permanent magnet comprising three first slits and a divided base body according to an exemplary embodiment.

FIG. 16 shows a cross-sectional view of a permanent magnet 100 comprising three first slits 121 and a divided base body 110 according to an exemplary embodiment. The embodiment shown in FIG. 16 is similar to the embodiment shown in FIG. 1 without the separation of the base body 110.

The base body 110 comprises a first part 1601 comprising the first side 131 and a second part 1602 comprising the second side 132, wherein the first part 1601 has a first mounting surface which is mounted to a second mounting surface of the second part 1602. The first part 1601 and the second part 1602 are structurally separated and are fixed together by welding or by gluing. In particular, between the first part 1601 and the second part 1602 a layer 1603 of fixation material, such as glue, is provided. Hence, by providing an additional layer 1603 between the first part 1601 and the second part 1601, the reduction of eddy current losses becomes more effective.

The first part 1601 and the second part 1602 may be divided such that the first mounting surface and the second mounting surface, respectively is perpendicular to the slits 121. However, in other embodiments, the first mounting surface and the second mounting surface may be angled with respect to the slits 121. The embodiment of the base body 110 comprising two parts 1601, 1602 may be applied also to the exemplary embodiment shown in FIG. 2 to FIG. 13. Additionally, the base body 110 may be also separated in more than two parts 1601, 1602, such that further layers of e.g. glue are provided.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A permanent magnet for a permanent magnet machine, comprising a base body having a first side and a second side which is an opposite side with respect to the first side, wherein at least one first slit is formed in the base body such that the at least one first slit extends from the first side toward the second side, without an opening in the second side, such that the at least one first slit is a blind hole inside the base body,
    wherein the base body includes a first part comprising the first side, and a second part comprising the second side,
    wherein the first part has a first mounting surface which is mounted to a second mounting surface of the second part,
    wherein in between the first mounting surface and the second mounting surface a fixation material layer is arranged for fixing the first part and the second part together, and
    wherein a first end of the at least one first slit is a bottom of the blind hole at which the at least one first slit ends inside the base body and wherein the first end is arranged in the second part.

2. The permanent magnet according to claim 1,
    wherein at least one further first slit is formed in the base body such that the at least one first slit and the at least one further first slit extend parallel to each other.

3. The permanent magnet according to claim 1,
    wherein at least one second slit is formed in the base body such that the at least one second slit extends from the second side in the direction of the first side,
    wherein the base body is formed such that the at least one first slit and the at least one second slit are arranged alternatingly in a direction which is parallel to the first side.

4. The permanent magnet according to claim 1,
    wherein the base body is formed such that the at least one first slit extends perpendicular to the first side.

5. The permanent magnet according to claim 1,
    wherein the base body is formed such that an angle is formed between the at least one first slit and the first side, wherein the angle is in the range of 0° to 180°.

6. The permanent magnet according to claim 1,
    wherein the base body is formed such that the at least one first slit extends from the first side in the direction of the second side more than at least 1% of a distance between the first side and the second side, wherein the at least one first slit is formed in the base body such that in a cross-section view of the base body, the at least one first slit has a straight, saw-toothed and/or undulated shape.

7. The permanent magnet according to claim 1, wherein the base body further comprises a third side and a fourth side which is an opposite side with respect to the third side, and wherein the third side and the fourth side interconnect the first side and the second side, wherein at least one third slit is formed in the base body such that the at least one third slit extends from the third side in the direction of the fourth side, wherein in particular at least one fourth slit is formed in the base body such that the at least one fourth slit extends from the fourth side in the direction of the third side.

8. The permanent magnet according to claim 1, wherein a first direction is parallel to the first side, wherein a second side is an opposite side with respect to the first side, wherein a third side and a fourth side interconnect the first side and the second side, wherein a second direction is parallel to the third side, wherein a third direction is perpendicular to the first direction and the second direction, and wherein the at least one first slit extends entirely through the base body in the third direction.

9. The permanent magnet according to claim 1, wherein the fixation material layer is a glue layer is arranged for gluing the first part and the second part together.

10. A permanent magnet machine, comprising
a permanent magnet according to claim 1, and
a component which generates a magnetic field.

11. The permanent magnet machine according to claim 10, wherein the permanent magnet is arranged in the permanent magnet machine such that the magnetic field is providable perpendicular to an extension of the at least one first slit.

12. The permanent magnet machine according to claim 10, wherein a distance between adjacent first slits and the depth of the first slit depends on the strength of the magnetic field.

13. A method of manufacturing a permanent magnet for a permanent magnet machine, comprising providing a base body having a first side and a second side which is an opposite side with respect to the first side, forming at least one first slit in the base body, such that the at least one first slit extends from the first side in the direction of the second side, wherein the base body comprises a first part comprising the first side and a second part comprising the second side, wherein the first part has a first mounting surface which is mounted to a second mounting surface of the second part, wherein before the step of forming the at least one first slit the method comprises fixing the first mounting surface and the second mounting surface together for forming the base body and for providing a fixation material layer between the first part and the second part.

14. The method according to claim 13, wherein the fixation material layer is a glue layer between the first part and the second part.

* * * * *